United States Patent
Slaney et al.

(10) Patent No.: US 6,968,565 B1
(45) Date of Patent: Nov. 22, 2005

(54) DETECTION OF CONTENT DISPLAY OBSERVERS WITH PREVENTION OF UNAUTHORIZED ACCESS TO IDENTIFICATION SIGNAL

(75) Inventors: Malcolm Slaney, Los Altos Hills, CA (US); Bonnie M. Johnson, Palo Alto, CA (US); Annarosa Tomasi, Menlo Park, CA (US); Michele M. Covell, Los Altos Hills, CA (US); Gavin S. P. Miller, Palo Alto, CA (US); Steven E. Saunders, Cupertino, CA (US)

(73) Assignee: Vulcan Patents LLC, Seattle, WA (US)

( * ) Notice: Subject to any disclaimer, the term of this patent is extended or adjusted under 35 U.S.C. 154(b) by 985 days.

(21) Appl. No.: 09/724,789

(22) Filed: Nov. 28, 2000

Related U.S. Application Data

(63) Continuation-in-part of application No. 09/514,056, filed on Feb. 25, 2000, now Pat. No. 6,574,793.

(60) Provisional application No. 60/198,039, filed on Apr. 18, 2000, provisional application No. 60/198,037, filed on Apr. 18, 2000, provisional application No. 60/198,038, filed on Apr. 18, 2000, provisional application No. 60/198,036, filed on Apr. 18, 2000, provisional application No. 60/198,034, filed on Apr. 18, 2000, provisional application No. 60/185,182, filed on Feb. 25, 2000.

(51) Int. Cl.$^7$ .............................. H04N 9/00; H04N 7/16
(52) U.S. Cl. ......................... 725/10; 725/25; 348/156
(58) Field of Search ................................ 725/9, 10, 12, 725/14, 18; 348/143, 152, 153, 154, 155; H04N 9/00, H04N 7/16

(56) References Cited

U.S. PATENT DOCUMENTS

| 4,258,386 A | 3/1981 | Cheung ........................ 358/84 |
| 4,546,382 A | 10/1985 | McKenna et al. ............. 358/84 |
| 4,602,279 A | 7/1986 | Freeman ...................... 358/86 |
| 5,164,992 A | * 11/1992 | Turk et al. .................. 382/118 |
| 5,223,924 A | 6/1993 | Strubbe ....................... 358/86 |

(Continued)

FOREIGN PATENT DOCUMENTS

WO     WO94/13107     6/1994

(Continued)

OTHER PUBLICATIONS

"General Instrument & ACTV to Offer a Complete Solution for Addressable Targeted Digital Television Advertising," Press release, www.actv.com/newpage/press/actvgiad.html, Jun. 14, 1999.

(Continued)

*Primary Examiner*—Vivek Srivastava
(74) *Attorney, Agent, or Firm*—Van Pelt, Yi & James LLP

(57) ABSTRACT

The invention enables and/or facilitates the display of personalized content to content observers by content providers (e.g., advertisers) who disseminate content over a network. The invention enables identification of particular content observers at a content display site using analysis of content observation behavior at a content display site, data regarding one or more physical characteristics of content observers in the vicinity of the content display device during display of particular content, and/or analysis of demographic characteristics of possible content observers at the content display site. The invention prevents unauthorized access to data produced as part of identification of the content observer.

24 Claims, 2 Drawing Sheets

U.S. PATENT DOCUMENTS

| | | | |
|---|---|---|---|
| 5,410,344 A | 4/1995 | Graves et al. | 348/1 |
| 5,440,337 A * | 8/1995 | Henderson et al. | 348/144 |
| 5,446,919 A | 8/1995 | Wilkins | 455/6.2 |
| 5,481,294 A * | 1/1996 | Thomas et al. | 725/20 |
| 5,497,185 A * | 3/1996 | Dufresne et al. | 725/11 |
| 5,515,098 A | 5/1996 | Carles | 348/8 |
| 5,532,735 A | 7/1996 | Blahut et al. | 348/13 |
| 5,550,928 A * | 8/1996 | Lu et al. | 382/116 |
| 5,559,549 A | 9/1996 | Hendricks et al. | 348/6 |
| 5,579,055 A | 11/1996 | Hamilton et al. | 348/476 |
| 5,596,373 A | 1/1997 | White et al. | 348/569 |
| 5,600,364 A | 2/1997 | Hendricks et al. | 348/1 |
| 5,600,573 A | 2/1997 | Hendricks et al. | 364/514 |
| 5,608,445 A | 3/1997 | Mischler | 348/4 |
| 5,619,709 A | 4/1997 | Caid et al. | 395/794 |
| 5,659,350 A | 8/1997 | Hendricks et al. | 348/6 |
| 5,661,516 A | 8/1997 | Carles | 348/8 |
| 5,682,195 A | 10/1997 | Hendricks et al. | 348/6 |
| 5,704,017 A | 12/1997 | Heckerman et al. | 395/61 |
| 5,708,478 A | 1/1998 | Tognazzini | 348/552 |
| 5,717,814 A | 2/1998 | Abecassis | 386/46 |
| 5,717,923 A | 2/1998 | Dedrick | 395/613 |
| 5,724,091 A | 3/1998 | Freeman et al. | 348/13 |
| 5,724,472 A | 3/1998 | Abecassis | 386/52 |
| 5,724,521 A | 3/1998 | Dedrick | 395/226 |
| 5,729,279 A | 3/1998 | Fuller | 348/8 |
| 5,734,853 A | 3/1998 | Hendricks et al. | 395/352 |
| 5,740,549 A | 4/1998 | Reilly et al. | 705/14 |
| 5,767,894 A | 6/1998 | Fuller et al. | 348/8 |
| 5,771,307 A | 6/1998 | Lu et al. | 382/116 |
| 5,774,170 A | 6/1998 | Hite et al. | 348/9 |
| 5,786,845 A | 7/1998 | Tsuria | 348/9 |
| 5,793,409 A * | 8/1998 | Tetsumura | 725/12 |
| 5,794,210 A | 8/1998 | Goldhaber et al. | 705/14 |
| 5,798,785 A | 8/1998 | Hendricks et al. | 348/1 |
| 5,805,974 A | 9/1998 | Hite et al. | 455/3.2 |
| 5,812,647 A | 9/1998 | Beaumont et al. | 379/111 |
| 5,818,512 A | 10/1998 | Fuller | 348/8 |
| 5,826,165 A | 10/1998 | Echeita et al. | 455/2 |
| 5,862,324 A | 1/1999 | Collins | 395/200.5 |
| 5,872,588 A | 2/1999 | Aras et al. | 348/1 |
| 5,872,850 A | 2/1999 | Klein et al. | 380/49 |
| 5,873,068 A | 2/1999 | Beaumont et al. | 705/14 |
| 5,874,986 A | 2/1999 | Gibbon et al. | 348/13 |
| 5,877,755 A | 3/1999 | Hellhake | 345/327 |
| 5,892,535 A | 4/1999 | Allen et al. | 348/9 |
| 5,892,554 A | 4/1999 | DiCicco et al. | 848/584 |
| 5,917,553 A | 6/1999 | Honey et al. | 348/578 |
| 5,926,207 A | 7/1999 | Vaughan et al. | 348/13 |
| 5,933,811 A | 8/1999 | Angles et al. | 705/14 |
| 5,948,061 A | 9/1999 | Merriman et al. | 709/219 |
| 5,953,076 A | 9/1999 | Astle et al. | 348/584 |
| 5,966,120 A | 10/1999 | Arazi et al. | 345/327 |
| 5,974,398 A | 10/1999 | Hanson et al. | 705/14 |
| 5,990,927 A | 11/1999 | Hendricks et al. | 348/6 |
| 6,002,393 A | 12/1999 | Hite et al. | 345/327 |
| 6,002,833 A | 12/1999 | Abecassis | 386/70 |
| 6,008,802 A | 12/1999 | Iki et al. | 345/327 |
| 6,011,895 A | 1/2000 | Abecassis | 386/69 |
| 6,020,883 A | 2/2000 | Herz et al. | 345/327 |
| 6,020,931 A | 2/2000 | Bilbrey et al. | 348/584 |
| 6,026,369 A | 2/2000 | Capek | 705/14 |
| 6,029,045 A | 2/2000 | Picco et al. | 455/5 |
| 6,036,601 A | 3/2000 | Heckel | 463/42 |
| 6,038,367 A | 3/2000 | Abecassis | 386/46 |
| 6,044,376 A | 3/2000 | Kurtzman, II | 707/102 |
| 6,052,554 A | 4/2000 | Hendricks et al. | 455/5.1 |
| 6,075,551 A | 6/2000 | Berezowski et al. | 348/9 |
| 6,112,192 A | 8/2000 | Capek | 705/59 |
| 6,519,769 B1 * | 2/2003 | Hopple et al. | 725/14 |
| 6,570,499 B2 * | 5/2003 | Kaganer | 340/541 |

FOREIGN PATENT DOCUMENTS

| | | |
|---|---|---|
| WO | WO95/15649 | 6/1995 |
| WO | WO95/15658 | 6/1995 |
| WO | WO 96/24115 | 8/1996 |
| WO | WO 97/00494 | 1/1997 |
| WO | WO 97/00581 | 1/1997 |
| WO | WO 97/00582 | 1/1997 |
| WO | WO 97/41683 | 11/1997 |
| WO | WO 98/24242 | 6/1998 |
| WO | WO 98/24243 | 6/1998 |
| WO | WO 98/28906 | 7/1998 |
| WO | WO 99/38320 | 7/1999 |
| WO | WO 99/45702 | 9/1999 |
| WO | WO 99/52285 | 10/1999 |
| WO | WO 99/60789 | 11/1999 |
| WO | WO 00/22818 | 4/2000 |
| WO | WO 00/33160 | 6/2000 |
| WO | WO 00/33163 | 6/2000 |
| WO | WO 00/33228 | 6/2000 |
| WO | WO 00/33233 | 6/2000 |

OTHER PUBLICATIONS

Delio, Michelle, "TV Commercials Get Personal," Wired News, www.wired.com/news/print/0,1294,38754,00.html, Sep. 20, 2000.

Lyon, Richard F., "The Optical Mouse, and an architectural Methodology for Smart Digital Sensors," Xerox PARC, VLSI-81-1, Aug. 1981.

"Scientific-Atlanta's Explorer 2000 Advanced Digital Set-Top will Support ACTV's 'Individualized Television'," Press release: www.actv.com/newpage/press/actvsatl.html, Jan. 25, 1999.

* cited by examiner

DETECTION OF CONTENT DISPLAY OBSERVERS WITH PREVENTION OF UNAUTHORIZED ACCESS TO IDENTIFICATION SIGNAL

CROSS-REFERENCE TO RELATED APPLICATIONS

This application is a continuation-in-part of U.S. provisional patent application Ser. Nos. 60/198,039, 60/198,037, 60/198,038, 60/198,036 and 60/198,034, filed on Apr. 18, 2000, U.S. provisional patent application Ser. No. 60/185,182, filed on Feb. 25, 2000, and U.S. patent application Ser. No. 09/514,056, filed on Feb. 25, 2000 now U.S. Pat. No. 6,574,793, the disclosures of which are hereby incorporated by reference herein.

This application is also related to the following commonly-owned, co-pending United States patent applications filed on the same date as the present application, the disclosure of each of which is hereby incorporated by reference herein: 1) "Targeted Television Content Display," by Malcolm Slaney et al., having Ser. No. 09/724,786; 2) "Auction for Targeted Content," by Malcolm Slaney, having Ser. No. 09/724,956; 3) "Display of Targeted Content Within a Television Program," by Malcolm Slaney et al., having Ser. No. 09/724,939; and 4) "Characterizing a Content Display Observer," by Malcolm Slaney, having Ser. No. 09/724,640.

BACKGROUND OF THE INVENTION

1. Field of the Invention

This invention relates generally to displaying targeted content to a content observer (such as a television viewer) and, in particular, to identification of a content observer to facilitate display of targeted content to the content observer. Most particularly, the invention relates to preventing unauthorized access to data produced as part of identification of the content observer.

2. Related Art

The direct marketing industry has demonstrated the value in being able to target content (in the case of direct marketing, typically an advertisement) to a particular type of consumer. A targeted advertisement increases the likelihood of stimulating a consumer's interest in a product or service. For example, the message that would be used effectively to sell a car to a family with children that places a high value on safety is clearly very different from the message that would be used effectively to sell the same car to a recent college graduate who is looking forward to the chance to spread their wings. Further, particular advertisers may desire to communicate only with particular consumers. For example, a manufacturer of feminine hygiene products may highly value the ability to show their commercial to a female, but will place little or no value on the ability to show the commercial to an elderly male viewer. Similarly, a skateboard manufacturer would love to show their advertisement to teens, but has little interest in showing the advertisement to viewers of other ages.

Like other content providers, content providers that deliver content for display on television (e.g., broadcast stations, cable operators) have an interest in delivering and displaying targeted content to television viewers. Television content providers desire to exploit the value of their product. Their primary vehicle for doing so is selling advertising time. Delivering custom advertisements targeted to particular viewers can increase the value of that advertising time. In many ways delivering custom television broadcast content is similar to the airline industry's efforts at yield management. Content providers (e.g., advertisers) have a period of time (e.g., 30 second commercial break in a television program) to present their message and if they don't extract the maximum value from this time then it is lost forever. Currently, television advertisers seek to target their advertising by picking appropriate television programs during which to show their advertisements. However, it is desirable to enable a more precise form of targeted marketing for television advertising and, more generally, to enable custom content delivery for use in display of television content (e.g., television broadcasts, on-demand television content delivery).

To effectively display targeted content, it is necessary to know who the content observer is. Conventional approaches to identification of a television viewer are based on the viewer doing something to indicate the viewer's identity. For example, one approach is to have a viewer push a button as the viewer enters or leaves the room in which the television is located. However, this approach is cumbersome and prone to error. Another approach is to have a viewer fill out a survey, identifying the viewer and the viewer's demographic information. However, this approach is also cumbersome and may be too time consuming or involved to produce adequate viewer participation. Still another approach is have a viewer watch television using a remote control that identifies the viewer to a set top box associated with the television. However, this approach is also prone to error (the wrong viewer may use the remote control). Further, each of the above approaches is effective only if the content is specialized enough or if some other incentive is provided so that the viewer will want to identify himself.

Another possible approach to identifying a television viewer is to use a camera to film the area in which a viewer may be present and identify each person filmed in that area. (See, e.g., the description of Nielsen's people-finder technology in the article entitled "Commercial television: Dead or alive? A status report on Nielsen's passive people meter," by Barry Cook, Journal of Advertising Research, March/April 1995, Vol. 35, No. 2, Pg. RC-5 to RC-10.) However, people are typically very concerned about the presence of a camera in their homes. For example, they may be concerned that the recording obtained by the camera will be used to disseminate pictures of them without their consent, notwithstanding assurances to the contrary. Thus, any system that uses a camera to identify a television viewer must be implemented so that privacy concerns are alleviated.

SUMMARY OF THE INVENTION

The invention enables and/or facilitates the display of personalized content to content observers by content providers (e.g., advertisers) who disseminate content over a network. In particular, the invention can be used to enable the display of targeted content to television viewers. The invention can be implemented for use with a television network by having a set top box (or similar television control device) with processing capability connected to each of multiple televisions on the network. A large variety of targeted content can be stored on data storage devices at each location of a content display device (e.g., data storage devices associated with television set top boxes). The "intelligent" set top boxes can be used to track the viewing habits of each viewer and to make decisions regarding which of the variety of targeted content to display to each viewer. The local storage and decision-making overcomes limitations of previous systems for delivering and displaying targeted content to observers. The invention can enable identification of particular content observers at a content display site to facilitate the display of targeted content to those content observers. Such identification can be accomplished using one or more devices for acquiring data regarding an aspect of the environment of the content display device, wherein the presence of the content observer in the vicinity of the content display device when the content observer is observing the content display device can be detected from the acquired data. For example, data can be acquired regarding one or more physical characteristics of a content observer present in the vicinity of the content display device during the display of content using, for example, a visual data acquisition device such as a camera, an audio data acquisition device such as a microphone, a fingerprint scanning device and/or a retinal scanning device. The use of such data acquisition device(s) can be implemented so as to alleviate privacy concerns of content observers by inhibiting unauthorized access to signal(s) produced by those data acquisition device(s) and processing devices used to identify content observer(s).

In one embodiment of the invention, identification of a content observer who views a content display device at a content display site is accomplished by i) acquiring data regarding an aspect of the environment of the content display device (e.g., data regarding a physical characteristic of a content observer), wherein the presence of the content observer in the vicinity of the content display device when the content observer is observing the content display device can be detected from the acquired data; ii) processing the data acquired by the sensor to produce data identifying the content observer; and iii) preventing unauthorized access to the acquired data and/or the data identifying the content observer.

The acquisition of data regarding an aspect of the environment of the content display device can be implemented using any device that accomplishes that function. Such data acquisition can be accomplished, for example, using a visual data acquisition device (e.g., a camera), an audio data acquisition device (e.g., a microphone), a fingerprint scanning device and/or a retinal scanning device.

The prevention of unauthorized access to the acquired data and/or the data identifying the content observer can be implemented by using a filter which removes all data from the acquired data that is not used or that is not necessary for production of data identifying the content observer. The prevention of unauthorized access to the acquired data and/or the data identifying the content observer can also be implemented by securing the devices used to acquire and/or produce data other than data which identifies the content observer in a generic manner. The prevention of unauthorized access to the acquired data and/or the data identifying the content observer can also be implemented by monitoring and prohibiting electronic access to the device used to acquire data and/or the device used to produce data identifying the content observer. The prevention of unauthorized access to the acquired data and/or the data identifying the content observer can also be implemented by enclosing the device used to acquire data and/or the device used to produce data identifying the content observer within a mechanically sealed enclosure. The prevention of unauthorized access to the acquired data and/or the data identifying the content observer can also be implemented by disabling operation of the device used to acquire data and/or the device used to produce data identifying the content observer at times when identification of content observers is not needed (e.g., when non-targeted content is being displayed or when the content display device is not operating).

The invention can be implemented with a variety of content display devices, including visual display devices, audio display devices and audiovisual display devices. The invention can, in particular, be advantageously used when the content display device is a television.

DETAILED DESCRIPTION OF THE INVENTION

The invention enables content providers (e.g., advertisers) to effect the display of content (e.g., advertisements) at each of multiple content display sites of a content distribution network that is targeted to content observer(s) at that content display site. In particular, the invention can be used to enable content providers to effect the display of content at each of multiple television viewing locations (e.g., residences such as homes and apartments) of a television network (e.g., conventional television networks, cable television networks, digital television networks, satellite television networks) that is targeted to television viewer(s) at that television viewing location. However, aspects of the invention can have broader applicability and can be used in effecting targeted content displays to content observers at content display sites of any appropriate content distribution network, e.g., a computer network such as the Internet (and, in particular, the World Wide Web portion of the Internet), a radio network, a network of real-time changeable billboard displays). Further, though it is anticipated that the invention will often be used to effect targeted display of visual (e.g., video, text), audio or audiovisual content, the invention can be used to effect targeted display of any type of content, including content that is sensed, in whole or in part, by taste, smell or touch.

Figure 1:
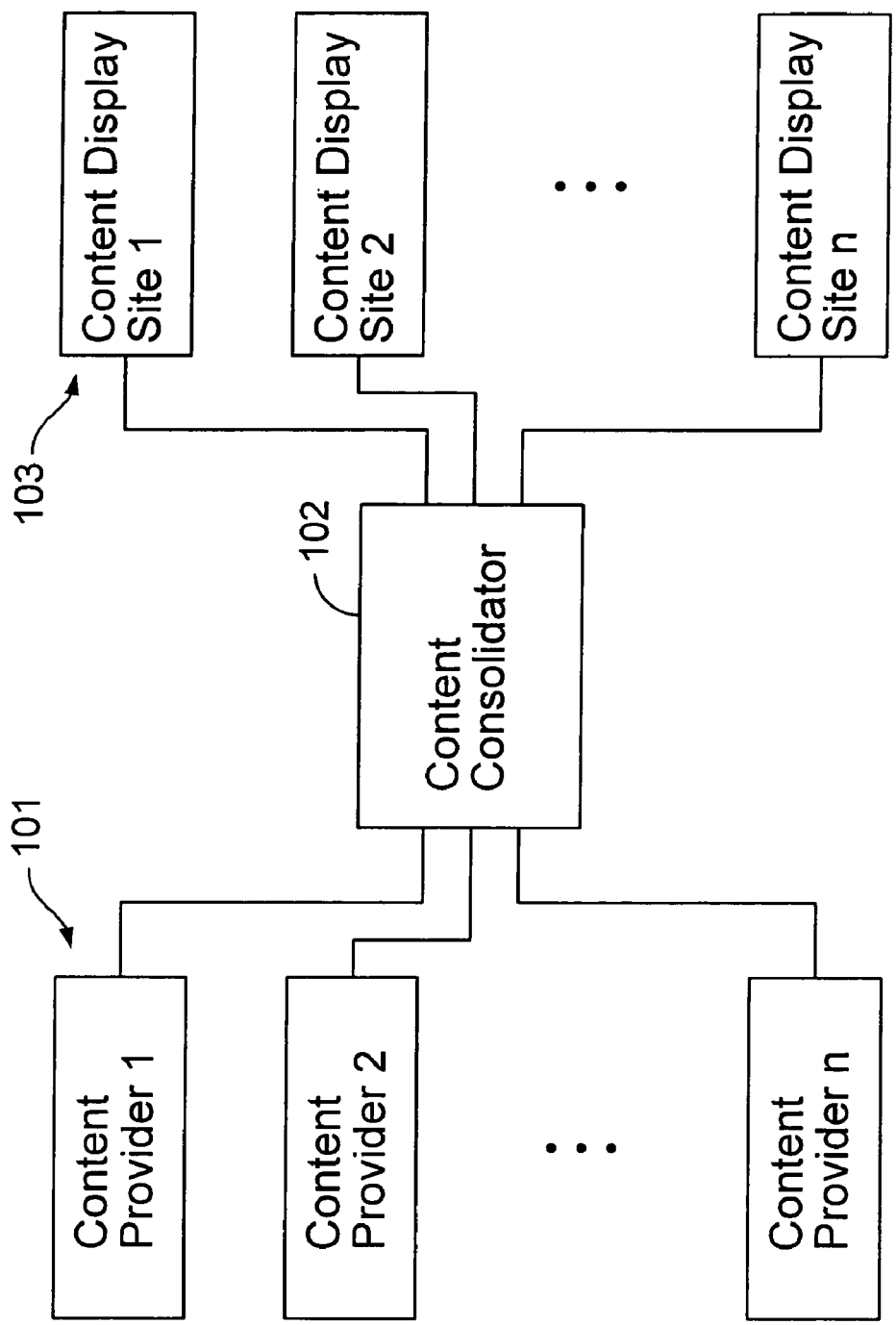
FIG. 1 is a block diagram of a content distribution network with which the invention can be used.

FIG. 1 is a block diagram of a content distribution network with which the invention can advantageously be used. Targeted content providers 101 each provide one or more sets of targeted content, each of which is intended for display to particular content observer(s) and/or particular content display site(s). In the system illustrated in FIG. 1, the sets of targeted content are transmitted to a content consolidator 102 which gathers sets of targeted content from the content providers 101 and transmits sets of targeted content to content display sites 103. For example, when the invention is used to effect the display of targeted television content, the content consolidator 102 can be embodied by a cable television system headend. Or, for example, when the invention is used to effect the display of targeted content on content display devices that are part of a computer network, the content consolidator 102 can be embodied by one or more server computers (e.g., one or more server computers used to implement a Web site). The invention can be implemented so that the content consolidator 102 transmits multiple sets of targeted content to a content display site 103 that can potentially be displayed during a targeted content display opportunity (e.g., a commercial break during a television program or between television programs, a product placement opportunity within a television program) at the content display site 103. At the time of the targeted content display opportunity at the content display site 103, an appropriate set of targeted content is selected (as described further below) at the content display site 103 for display to content observer(s) at that content display site 103 during the targeted content display opportunity. Alternatively, the invention can be implemented so that the content consolidator 102 selects an appropriate set of targeted content for display to content observer(s) at a content display site 103 and transmits only the selected set of targeted content to the content display site 103 for display at the content display site 103 during a targeted content display opportunity. (Other content can also be provided to the content display sites 103, e.g., television programs during or within which targeted content is to be displayed.) The content distribution network shown in FIG. 1 is merely illustrative of a manner in which the invention can be used; those skilled in the art will readily appreciate, in view of the description herein, that the invention can be used with other content distribution systems.

The above-referenced United States patent application having Ser. No. 09/724,786 (as indicated above, the disclosure of that application is incorporated by reference herein) describes an invention which enables content providers (e.g., advertisers) to effect the display of targeted content (e.g., advertisements) provided over a network for display to content observers (and, in particular, to enable content providers to display targeted content to television viewers). According to that invention, sets of targeted content can be stored in a data storage device associated with a content display system (e.g., a data storage device that is operably connected to, or integrated with, a set top box that is itself operably connected to, or integrated with, a television). The local data storage can be used to store a large inventory of sets of targeted content that may potentially be deemed sufficiently valuable (e.g., of sufficient interest) to warrant display to content observer(s) at that content display site. One or more sets of targeted content are selected from this local inventory for display to content observer(s) observing the content display device at the content display site at the time of a content display opportunity. Those skilled in the art will readily appreciate that all of the mechanisms for acquiring, storing, managing and displaying targeted content described in that patent application can be used with the instant invention and that the invention described herein can be used to enable identification of content observer(s) to facilitate the display of targeted content to those content observer(s), while preventing unauthorized access to data produced as part of identification of those content observer(s).

The above-referenced United States patent application having Ser. No. 09/724,956 (as indicated above, the disclosure of that application is incorporated by reference herein) describes an invention which enables use of an auction system for selecting content—and, even more particularly, targeted content—for display to content observers. The above-referenced United States patent application having Ser. No. 09/724,939 (as indicated above, the disclosure of that application is incorporated by reference herein) describes an invention which enables the display of targeted content (e.g., targeted product placements) within a television program and to displaying such targeted content based on the identity and/or a characteristic of a television viewer who is determined to be viewing a television at the time that the targeted content is to be displayed on the television. The above-referenced United States patent application having Ser. No. 09/724,640 (as indicated above, the disclosure of that application is incorporated by reference herein) describes an invention which enables identification of content observers to facilitate the display of targeted content to those content observers. As will be readily appreciated by those skilled in the art, the methods and apparatus described in those patent applications can also be used together with the invention described herein.

Figure 2:
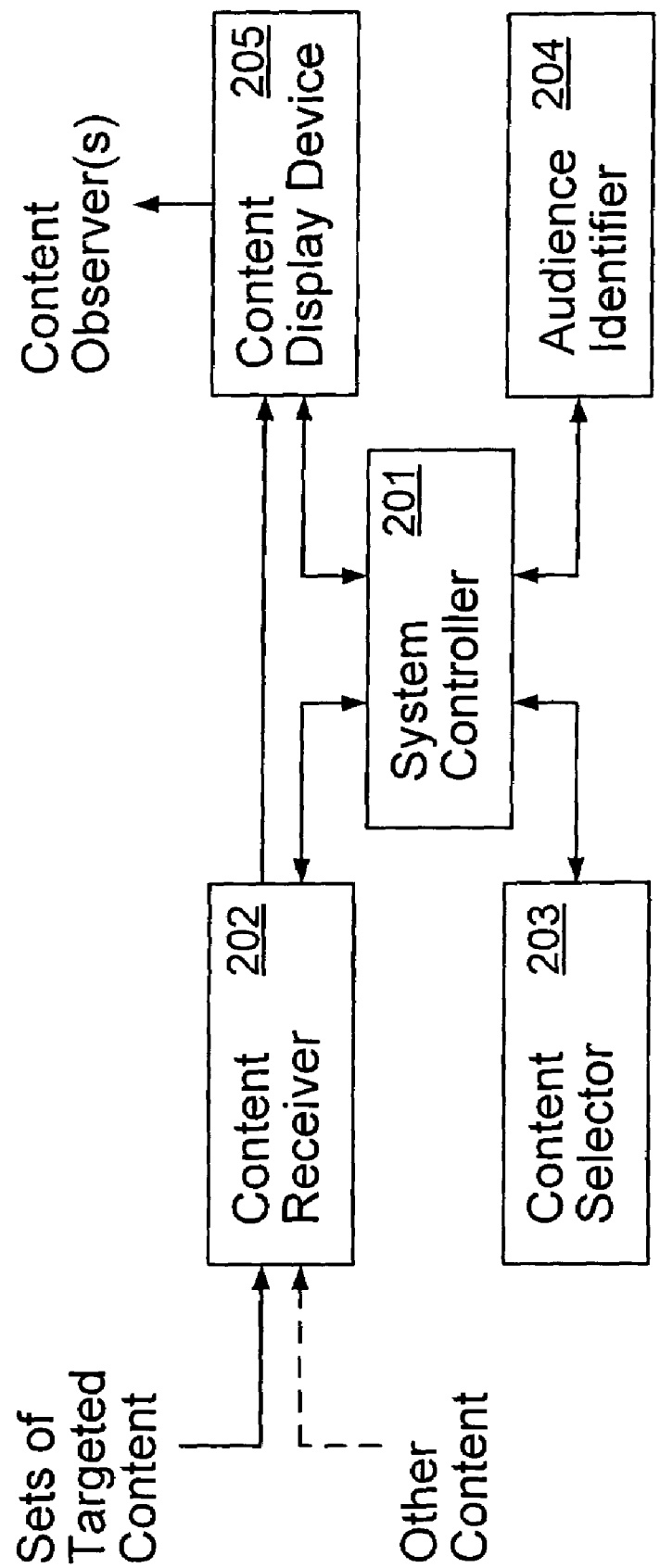
FIG. 2 is a block diagram of a system, according to an embodiment of the invention, for use at a content display site for displaying targeted content on a content display device at the content display site.

FIG. 2 is a block diagram of a system, with which the invention can be used, for use at a content display site for displaying targeted content on a content display device at the content display site. The system includes a system controller 201, a content receiver 202, a targeted content selector 203, an audience identifier 204 and a content display device 205. The system shown in FIG. 2 can be implemented (except for the content display device 205), for example, in an appropriately constructed television set top box including the functionality of such system as described herein. Such a television set top box (or other apparatus for embodying the system of FIG. 2) can readily be constructed by those of skill in the art in view of the description herein. The system controller 201 mediates and controls interaction among the other components of the system (the system could, alternatively, be implemented so that the functionality of the system controller 201 is distributed among one or more of the other components of the system shown in FIG. 2). Multiple sets of targeted content are received at the content display site by the content receiver 201. (Alternatively, as indicated above, an appropriate set of targeted content can be selected, in accordance with the principles of the invention, at a location remote from the content display site and transmitted to the content display site for display during a targeted content display opportunity.) Other content can also, but need not necessarily, be received by the content receiver 201. (It is anticipated that a system with which the invention can be used will often be used to effect the display of targeted content during or within the display of other, "primary" content; however, the such a system can also be used to produce targeted "primary" content displays.) The content receiver 201 also receives information regarding the desired audience for each set of targeted content (as described in more detail below). (This information is not transmitted to the content display site if the set of targeted content is selected at a location remote from the content display site.) When a targeted content display opportunity arises, the audience identifier 204 can identify the content observer(s) viewing the content display device 205 at that time (as described in more detail below) and/or the content display site. (Alternatively, the audience identifier 204 can have previously identified the content display site and/or likely content observer(s) at the content display site, the latter based on information previously obtained regarding content observer(s) at the content display site.) The system controller 201 communicates to the targeted content selector 203 information regarding the identity and/or a characteristic of the content observer(s) and/or the content display site, as well as information regarding the desired audience for each set of targeted content that can potentially be displayed during the targeted content display opportunity. The invention advantageously prevents unauthorized access to data (e.g., signal(s)) produced as part of identification of the content observer(s). The targeted content selector 203 selects one of the sets of targeted content for display to the content observer(s) during the targeted content display opportunity. In particular, the system shown in FIG. 2 can advantageously enable selection of a set of targeted content in accordance with a criterion based on the identity and/or a characteristic of the content observer(s) viewing the content display device 205 at the time of the content display opportunity. The selected set of targeted content is provided to the content display device 205 for generation of a display of that set of targeted content.

An important requisite of implementing a system for displaying targeted content is knowing (at least with an acceptable degree of certainty) who is observing each content display system. Unless the identity of the content observer(s) is known, the appropriate content cannot be displayed to those content observer(s).

The above-referenced United States patent application having Ser. No. 09/724,640 describes an invention in which one or more devices for acquiring data regarding a physical characteristic of a content observer present in the vicinity of a content display device (e.g., a visual data acquisition device such as a camera, an audio data acquisition device such as a microphone, a fingerprint scanning device, a retinal scanning device) can be used to enable identification of a content observer for purposes of enabling targeted content to be displayed to that content observer. The invention described in the United States patent application having Ser. No. 09/724,640 also enables the identity and/or a characteristic of a content observer to be determined using information regarding past content observation behavior and/or demographic information. All of the techniques described in that application (as indicated above, the disclosure of that application is incorporated by reference herein) for identifying a content observer can be used for the same purpose in a system or method according to the invention. The present invention can also prevent unauthorized access to data produced as part of identification of a content observer using those techniques.

As discussed above, people can be very concerned that the presence of a camera in their homes will undesirably intrude upon their privacy. The same concerns can apply as well to other devices for acquiring data regarding an aspect of the environment of the content display device (e.g., device for acquiring data regarding a physical characteristic of a content observer). This can be a significant drawback to the use of such devices in the identification of a content observer for purposes of displaying targeted content to the content observer.

According to the invention, one or more devices for acquiring data regarding an aspect of the environment of the content display device, wherein the presence of the content observer in the vicinity of the content display device when the content observer is observing the content display device can be detected from the acquired data (e.g., one or more devices for acquiring data regarding a physical characteristic of a content observer), can be used to identify content observers (e.g., television viewers) while preventing unauthorized access to signal(s) produced by those data acquisition device(s) and processing devices used to process the acquired data to identify content observer(s). A system according to the invention can be implemented using the following components: 1) a sensor (e.g., camera and/or one or more microphones) for sensing the environment in which the content observer(s) are located, 2) apparatus for using the data acquired by the sensor to identify the presence of content observer(s) at a display location (e.g., apparatus for performing a face identification method, a voice recognition system) and 3) apparatus for preventing unauthorized access to the signal produced by the sensor and/or the identification apparatus. As described further below, the apparatus for preventing unauthorized access to the signal produced by the sensor and/or the identification apparatus can be implemented in a variety of different ways depending on performance needs and privacy concerns.

As indicated above, a sensor of a system according to the invention can be implemented using a visual data acquisition device. A visual data acquisition device for use in the invention can be implemented using any appropriate conventional video technology (e.g., conventional camera). It is desirable that the visual data acquisition device have the capability to sense people over a wide angle of viewing positions. One way to do this is to rotate a horizontally mounted line sensor (such as can be found in many inexpensive scanners) about a horizontal axis to scan in the height dimension. The scan does not have to be particularly fast to enable sensing of who is present at the display location.

When the sensor is implemented using a visual data acquisition device, the apparatus for using the data acquired by the sensor to identify the presence of content observer(s) at a display location can be implemented by an apparatus for performing a face identification method. The face identification method can be implemented using any appropriate technique to identify the presence of faces. A survey of face identification methods can be found at www.cs.rug.nl/~peterkr/FACE/face.html. Particular face identification methods that can be used with the invention are described in, for example, "Human Face Detection in Visual Scenes," by Henry A. Rowley et al., Carnegie Mellon Computer Science Technical Report CMU-CS-95-158R, November 1995 (www.cs.cmu.edu/afs/cs.cmu.edu/user/har/Web/usr2/CMU-CS-95-15 8R/www-techreport2.html also describes these techniques); and "Face recognition using eigenfaces," M. A. Turk et al., Proceedings 1991 IEEE Computer Society Conference on Computer Vision and Pattern Recognition, June 1991, pp. 586–91, the disclosures of which are incorporated by reference herein. Face identification methods are often made more efficient by combining skin color detection and/or stereo range data as described in, for example, the above-referenced U.S. patent application Ser. No. 09/453,450. The methods taught therein can be used to enhance face identification methods used with the present invention.

Face identification for use with the invention can also be implemented using the Magic Morphin Mirror system described at www.interval.com/papers/1998-005/index.html, the disclosure of which is incorporated by reference herein, which uses stereo vision, color segmentation, and finally face-recognition algorithms to find people in front of a camera. The Magic Morphin Mirror system works by collecting the video from multiple cameras and then routing the signals to computers that find the people within the video frames.

The sensor and content observer identification apparatus can be implemented, for example, by constructing an integrated circuit chip that combines a sensor array and a face identification apparatus (see, e.g., "The Optical Mouse, and an Architectural Methodology for Smart Digital Sensors," by Richard F. Lyon, Xerox Parc report VLSI-81-1, August 1981, pp. 1–19) or by integrating the face detection neural net described in the above-referenced Rowley et al. paper into a sensor array. A signal is output from the sensor array indicating where faces are in the video image and how close the faces match the neural net's model. The information regarding matching is used for labeling the identity of the face.

A sensor can also be combined with a processing device that is adapted to filter the output pixels of a video image based on foreground/background, or facial characteristics as described above. The filtering could be based on color or range data. The output would consist of regions that are likely to consist of faces. Other regions not used to identify the presence of faces are blank.

A sensor of a system according to the invention can also be implemented using, in addition to, or instead of, a visual data acquisition device, an audio data acquisition device (e.g., one or more microphones) to obtain a recording of sounds in the vicinity of a content display device. A voice recognition method can then be used to implement to the apparatus for using the data acquired by the sensor to identify the presence of content observer(s). (The use of a voice recognition system for this purpose is also advantageous in that it can also be used to enable a content observer to control the content display device using spoken commands.) Current speech recognition systems operate adequately for small vocabularies. Using echo cancellation techniques that are common in speakerphones, the known sound from a television's speaker(s) can be canceled. The remaining audio signal can then be processed by a speech recognition system which recognizes a small number of commands that can be used to control the content display device, such as, for example, "next commercial" or "show me more". Speaker identification techniques, such as those described in "Automatic speaker recognition using Gaussian mixture speaker models," by D. A. Reynolds et al., Lincoln Laboratory Journal, MIT, vol. 8, no. 2, Fall 1995, pp. 173–192, the disclosure of which is incorporated by reference herein, enable sensed speech to be clustered and used to identify each possible content observer.

Face identification and voice recognition methods can be used to identify the presence of a content observer in the vicinity of a content display device, but they do not uniquely identify the content observer. The above-referenced United States patent application having Ser. No. 09/724,640 describes the use of other information, such as information regarding content observer(s)' observation behavior (e.g., the type of content displayed and/or the manner of display of content) and/or demographic information regarding possible content observers, to uniquely identify each content observer. The techniques described in that application (as indicated above, the disclosure of that application is incorporated by reference herein) for identifying a content observer can be used for the same purpose in a system or method according to the invention of this application.

A sensor of a system according to the invention can also be implemented using, in addition to, or instead of, a visual data acquisition device and/or an audio data acquisition device, a fingerprint scanning device and/or a retinal scanning device. The data obtained by such devices for each content observer is sufficiently unique that the data need not be further processed to enable the data associated with one content observer to be distinguished from that associated with another content observer. The fingerprint or retinal scanning devices are preferably implemented so that the fingerprint or retinal scan occurs without need for the content observer to take special action. For example, a fingerprint scanning device can be implemented in a user input device that is necessary for operation of the content display system (e.g., a remote control device for operation of a television, a keyboard or mouse for operation of a computer) so that a content observer naturally grasps the input device in a manner that enables a fingerprint scan to be done automatically each time that a content observer uses the input device to operate the content display system. Fingerprint scanning devices and retinal scanning devices that can readily be modified for use with the invention are known to those skilled in that art. For example, fingerprint scanning devices such as those available from Identix Incorporated of Sunnyvale, Calif. can be modified for use with the invention.

An important goal of the invention is to protect the privacy of content observers. As indicated above, the apparatus for preventing unauthorized access to the signal produced by the sensor and/or the identification apparatus can be implemented in a variety of different ways. Some examples are described below. The invention can be implemented to include one or more of the privacy protection techniques described below, as appropriate, as well as other techniques achieving the same or similar functionality, as can be appreciated by those skilled in the art.

For example, a filter can be used in a system or method according to the invention to remove portions of the signal obtained by the sensor that are irrelevant and/or unnecessary to the detection of the presence of a content observer and/or to the determination of the characteristics associated with a content observer. (A filter can also be used in a system or method according to the invention to reduce the processing requirements for other aspects of the processing of the signal obtained by the sensor.)

A visual data acquisition device used in the identification of content observer(s) at a display location will typically be mostly stationary. Therefore, background subtraction techniques (where "background" is pixels that do not "change," e.g., change less than a threshold amount) can be used to remove large portions of the image (i.e., to accomplish filtering of the image) obtained by the visual data acquisition device. The background subtraction techniques used should be tested to verify that they work with changing lighting conditions at the display location.

A filter for use in a system or method according to the invention can be implemented using, for example, the techniques described in the paper found at www.eecs.lehigh.edu/FRAME/Elgammal/bgmodel.html, the disclosure of which is incorporated by reference herein. A filter for use in a system or method according to the invention can also be implemented using, for example, the techniques described in the commonly-owned, co-pending U.S. patent application Ser. No. 09/453,450, entitled "Background Estimation and Segmentation Based on Range and Color," filed on Dec. 3, 1999, by Gaile Gordon et al., the disclosure of which is incorporated by reference herein, to, for example, find skin in the video image and remove all else.

A filter for use in a system or method according to the invention can also be implemented by applying an EigenFace filter to video data as the video data is collected. Only the pixels that pass the EigenFace filter are output. All other pixels are assigned a value of zero. Clustering and face identification can then be performed on the non-zero pixels. Such a filtering method is described in detail in "CoMedia: Using Computer Vision to Support Awareness and Privacy in Mediaspaces," by Joelle Coutaz et al., Proceedings of the ACM Conference on Computer-Human Interactions, 1999, the disclosure of which is incorporated by reference herein.

The invention can also be implemented to prevent the data obtained by the sensor (e.g., visual data acquisition device, audio data acquisition device, audiovisual data acquisition device) from being extracted from apparatus for implementing the invention (e.g., sensor, processing device for processing the data acquired by the sensor to identify content observer(s), data storage device for storing the data acquired by the sensor) at the content display site. This can be done in any appropriate manner. For example, access to the electronic components of an apparatus for implementing the invention can be monitored and restricted so as to prevent access to the data acquired by the sensor. Alternatively or additionally, the apparatus for implementing the invention can be enclosed within a mechanically sealed enclosure (e.g., a mechanically sealed housing).

Further, a system according to the invention can be implemented to restrict the information allowed to be transmitted from the display location. In particular, the invention can be implemented to restrict the transmission from the display location of information regarding the content observer(s) present at the display location so that no information deemed sufficiently personal (e.g., precise identification of content observer(s), such as name(s), or identification of viewing habits of content observer(s)). The invention can be implemented, for example, to only allow reporting to content providers that the content they provide has been displayed (and, in particular, has been displayed to the desired type of content observer); no other information is allowed to be transmitted from the content display site. Such restriction can be implemented by, for example, a computer program or firmware including instructions and/or data that effects such functionality.

When multiple content observers can observe the content display device at a content display site, it is desirable to be able to uniquely identify each content observer. One way to do this is to identify each content observer by name or some other form of personal identification, such as a social security number. However, such personal identification may be deemed too intrusive by content observers. An important aspect of the invention is that content observers are never identified precisely (e.g., by name). In order to uniquely identify each content observer while still protecting the privacy of the content observer, the invention can be implemented so that each content observer is identified in a generic manner that still uniquely indicates that content observer. Instead, the presence of content observer(s) at the display location is identified and each content observer is assigned a label. For example, each content observer can be represented by a particular unique symbol (such as a unique icon or color). Each content observer can also be identified by a set of one or more generic characteristics (e.g., sex, age, viewing interest(s)). Such identifying characteristics can be associated with an appropriate symbol identifier. Prospectively, each time a previously identified content observer is determined to be present again, the presence of the content observer is indicated only by the label associated with the content observer. The label(s) can be displayed to the content observer(s) (rather than name(s)), reassuring the content observer(s) that they are identified no more personally than by the label(s). Further, the invention can make use of apparatus for securing the sensor and/or the identification apparatus to prevent access to information other than information which identifies a content observer using a generic symbol or in terms of the generic descriptive characteristics associated with the content observer.

The privacy of content observers can also be protected by disabling operation (e.g., disabling operation of the sensor) of an identification system according to the invention at times when identification of content observers is not needed. For example, operation of the identification system can be disabled when non-targeted content is displayed (e.g., during display of non-commercial content) and/or when the content display device is not operating (e.g., by detecting when a set top box associated with a television is powered off or by using a microphone to sense the audio environment to determine whether a television has been turned off).

Generally, the invention can be used with a system used to display any type of targeted content. For example, the invention can be used with a system to display targeted advertisements during commercial breaks during television programs. Or, for example, the invention can be used with a system to display targeted content (e.g., targeted product placements) within a television program. The invention can be used with a system to distribute targeted content over a computer network such as the Internet (and, in particular, the World Wide Web portion of the Internet). The invention can also be used with systems to display targeted content for radio programs or real-time changeable billboard displays.

Various embodiments of the invention have been described. The descriptions are intended to be illustrative, not limitative. Thus, it will be apparent to one skilled in the art that certain modifications may be made to the invention as described herein without departing from the scope of the claims set out below.

We claim:

1. A system for identifying a content observer who views a content display device at a content display site, comprising:

a sensor for acquiring data regarding an aspect of the environment of the content display device, wherein the presence of the content observer in the vicinity of the content display device when the content observer is observing the content display device can be detected from the data acquired by the sensor;

means for processing the data acquired by the sensor to produce data identifying the content observer; and means for preventing unauthorized access to the data acquired by the sensor and/or the data produced by the processing means;

wherein the means for preventing unauthorized access comprises a filter configured to ensure that only a subset of the acquired data that was or could have been used by the processing means to produce data identifying the content observer and/or only a subset of the produced data identifying the content observer is stored;

whereby the content observer's privacy is protected by limiting the amount of acquired and/or produced data that is stored and potentially subject to being accessed without authorization.

2. A system as in claim 1, wherein the sensor comprises a visual data acquisition device.

3. A system as in claim 2, wherein the visual data acquisition device comprises a camera.

4. A system as in claim 2, wherein the visual data acquisition device comprises a line sensor mounted to rotate about a horizontal axis.

5. A system as in claim 2, wherein the processing means comprises means for performing a face identification method on the data obtained by the visual data acquisition device.

6. A system as in claim 2, further comprising a filter which uses background subtraction to remove data from the acquired data.

7. A system as in claim 1, wherein the sensor comprises an audio data acquisition device.

8. A system as in claim 7, wherein the audio data acquisition device comprises a microphone.

9. A system as in claim 7, wherein the processing means comprises means for performing a voice identification method on the data obtained by the audio data acquisition device.

10. A system as in claim 1, wherein the means for preventing unauthorized access further comprises means for securing the sensor and/or the processing means to prevent access to data other than data which identifies the content observer in a generic manner.

11. A system as in claim 1, wherein the means for preventing unauthorized access further comprises:
   means for monitoring electronic access to the sensor and/or processing means; and
   means for prohibiting electronic access to the data acquired by the sensor.

12. A system as in claim 1, wherein the means for preventing unauthorized access further comprises means for enclosing the sensor and the processing means within a mechanically sealed enclosure.

13. A system as in claim 1, wherein the means for preventing unauthorized access further comprises means for disabling operation of the sensor and/or processing means at times when identification of content observers is not needed.

14. A system as in claim 13, wherein the means for disabling further comprises:
   means for detecting when non-targeted content is being displayed; and
   means for disabling operation of the sensor and/or processing means when non-targeted content is displayed.

15. A system as in claim 13, wherein the means for disabling further comprises:
   means for detecting when the content display device is not operating; and
   means for disabling operation of the sensor and/or processing means when the content display device is not operating.

16. A system as in claim 15, wherein the means for detecting when the content display device is not operating further comprises means for detecting the application of power to the content display device.

17. A system as in claim 15, wherein:
   the content display device comprises an audio display device; and
   the means for detecting when the content display device is not operating further comprises:
   an audio data acquisition device for acquiring audio data representing sound proximate to the content display device; and
   means for analyzing the audio data to determine whether the content display device is operating.

18. A system as in claim 1, wherein the sensor and processing means are integrated into one apparatus.

19. A system as in claim 18, wherein the sensor and processing means are formed in an integrated circuit comprising a sensor array for acquiring visual data and circuitry for analyzing the visual data acquired by the sensor array to identify the presence of one or more faces in the visual data.

20. A system as in claim 1, wherein the content display device comprises a visual display device.

21. A system as in claim 1, wherein the content display device comprises an audio display device.

22. A system as in claim 1, wherein the content display device comprises an audiovisual display device.

23. A system as in claim 1, wherein the content display device comprises a television.

24. A method for identifying a content observer who views a content display device at a content display site, comprising:
   acquiring data regarding an aspect of the environment of the content display device, wherein the presence of the content observer in the vicinity of the content display device when the content observer is observing the content display device can be detected from the acquired data;
   processing the acquired data to produce data identifying the content observer; and
   preventing unauthorized access to the data regarding an aspect of the environment of the content display device and/or the data identifying the content observer including by storing only a subset of the acquired data that was or could have been used to produce data identifying the content observer and/or only a subset of the produced data identifying the content observer;
   whereby the content observer's privacy is protected by limiting the amount of acquired and/or produced data that is stored and potentially subject to being accessed without authorization.

* * * * *